April 30, 1968  H. DACQUAY  3,380,337
PHOTOGRAPHIC REPRODUCING APPARATUS
Filed Jan. 28, 1965  4 Sheets-Sheet 1
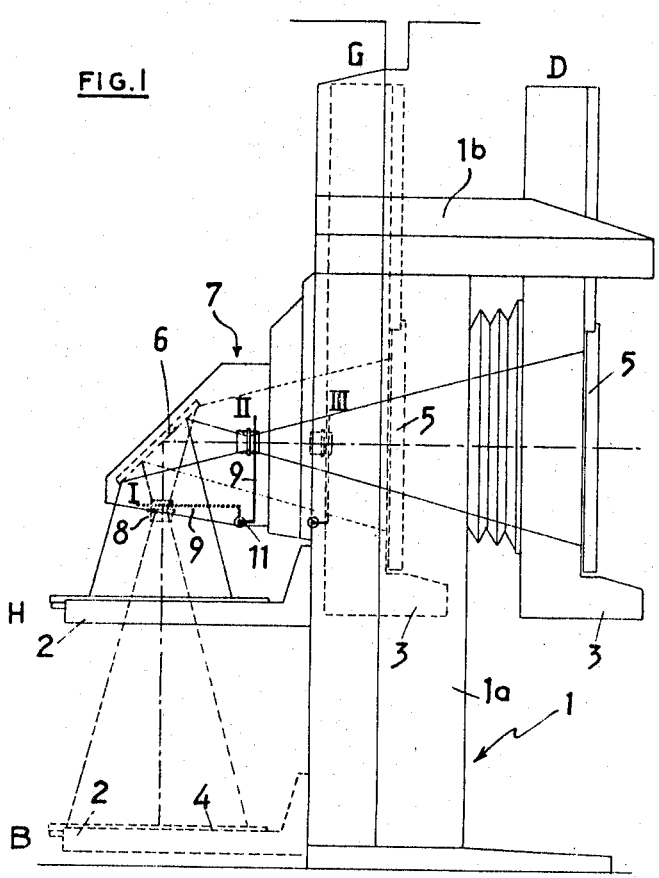
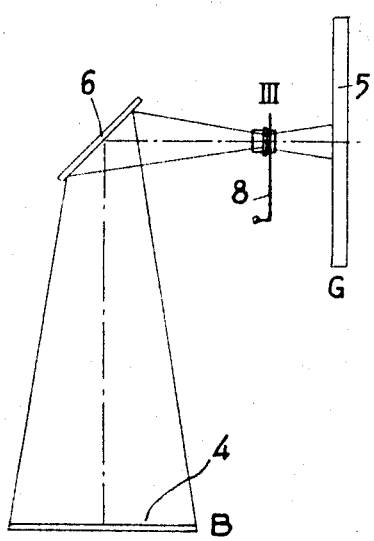
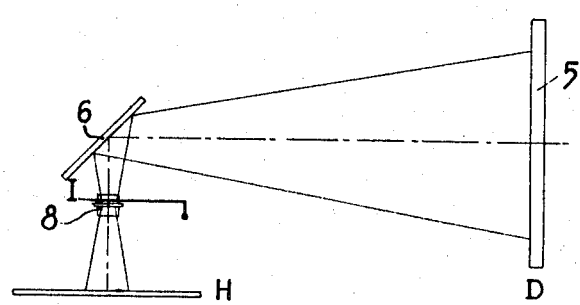
INVENTOR
HENRI DACQUAY
By
ATTORNEYS April 30, 1968        H. DACQUAY        3,380,337
PHOTOGRAPHIC REPRODUCING APPARATUS
Filed Jan. 28, 1965        4 Sheets-Sheet 2
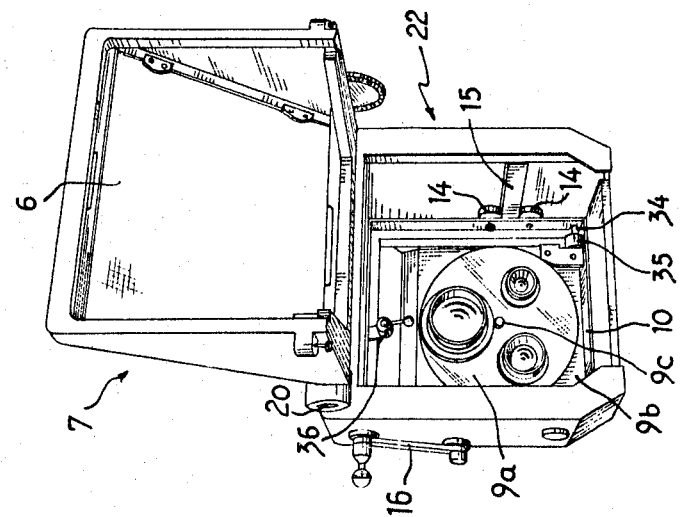
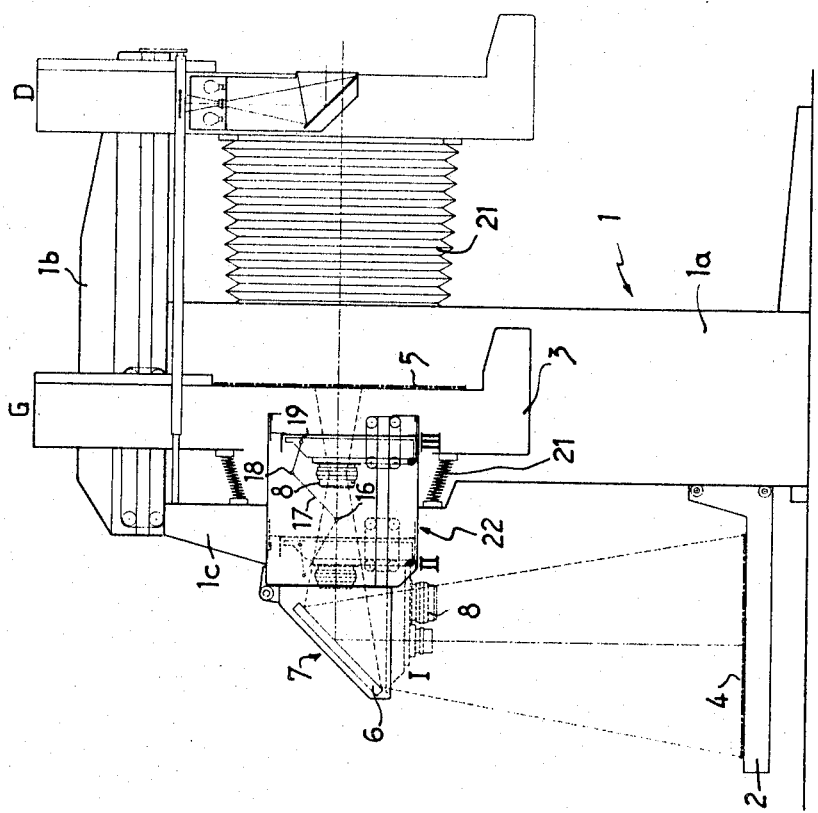
INVENTOR
HENRI DACQUAY
By
ATTORNEYS

United States Patent Office 3,380,337
Patented Apr. 30, 1968

3,380,337
PHOTOGRAPHIC REPRODUCING APPARATUS
Henri Dacquay, 180 Ave. de Paris, Chatillon
sous Bagneux, France
Filed Jan. 28, 1965, Ser. No. 428,684
Claims priority, application France, Feb. 3, 1964,
962,439; Dec. 24, 1964, 999,924
10 Claims. (Cl. 88—24)

The present invention relates to photographic reproducing apparatus comprising essentially a document carrier, a film carrier and at least one objective and one optical element for image transfer between the document carrier and the film carrier in order to obtain on the registration surface an enlarged or reduced image of the document.

The reproducing apparatuses of the kind known as "vertical" comprise, for example, a vertical film carrier, a mirror inclined at 45° to the horizontal and a horizontal document carrier, the light rays coming from the document being reflected at the mirror before passing through the objective to act on the film.

In such apparatus, the film carrier and/or the document carrier may be moved bodily in accordance with the required scale of reproduction and the limitations which are imposed in practice on the displacements of these elements limit equally the possibilities of use of a given type of apparatus.

Thus in installations comprising a document carrier carriage which is vertically displaceable between two end positions, the objectives used do not exceed in practice 480 mm., use of objectives of greater focal length requiring an excessive extension of the carriage travel at the price of a much more costly and cumbersome installation.

It has however been found that it is possible to give conventional installations possibilities of greater use by a judicious mounting of the objective or objectives of the reproducing apparatus.

In general terms, the invention envisages effecting a relative displacement of the objective and of the image transfer device, a device which in the following will be referred to as a "mirror," it being understood that this is merely one non-limiting example of such a device.

This displacement, which is effected with the purpose of increasing the possibilities of enlargement or of reduction of a reproducing apparatus provided with a given optical system, makes the objective or the mirror move from one working position to another working position, meaning by the expression "working position" a position in which the objective or the mirror may operatively serve for a process of reproduction.

The relative displacement of the objective and of the mirror may be obtained, in accordance with the invention, by a translatory and/or a pivotal movement: these movements may be interpreted as special cases of a rotary movement.

This relative displacement is preferably effected by moving the objective and holding the mirror in fixed position, for a displacement of the mirror would have to be accompanied by a displacement of the document carrier cooperating with this mirror in order that this cooperation should be maintained, while a displacement of the objective does not require corresponding displacement of the film carrier or of the document carrier; however the invention does not exclude the possibility in certain cases of effecting the relative displacement of the objective and of the mirror by displacement of the mirror.

The objective may, in accordance with the invention, be mounted for translatory or pivotal movement in relation to the device for returning the image, the axis of translation and the axis of pivoting being respectively parallel and perpendicular to the optical axis of the objective.

Instead of occupying a fixed position in relation to the mirror, as in known apparatus, the objective may then be displaced in relation to it.

In an example of a preferred embodiment of an apparatus improved in accordance with the invention, the objective may occupy any one of at least two working positions situated between the film carrier and the mirror, passage from one position to another being effected by translatory movement of the objective along its optical axis and it may occupy either of two positions calculated one from the other by pivoting of the objective through 90° about an axis perpendicular to its optical axis, these two positions being situated one between the mirror and the document carrier to be reproduced and the other between the mirror and the film carrier.

To sum up, the objective may occupy one or another of at least two end working positions which are located one between the mirror and the film carrier and the other between the mirror and the document carrier.

In the first position objectives of short focal length permit great reduction, and these same objectives allow great enlargement in the other extreme position, a position in which objectives of greater focal length are moreover usable for work on reduced scale; any intermediate position between these two end positions enables moreover work to be effected on an intermediat escale with objectives of great focal length.

In vertical apparatus for example, in accordance with the invention, the greatest enlargements are obtained by disposing the objective horizontally between the document and the mirror, and the greatest productions are obtained in disposing it vertically between the mirror and the document.

It is moreover to be noticed, in accordance with another advantage of the mounting of the invention, that the objective, when it is placed between the document and the mirror protects the latter from the heat of the lamps which illuminate the document, a protection which does not exist in conventional apparatus where document and mirror are directly facing each other.

For a given reproduction setup, the arrangement of the invention enables moreover to operate with a distance between the document and the mirror greater than that which would obtain if one used a conventional arrangement and this greater distance of the document particularly facilitates its illumination.

These advantages and other features of the present invention will be better understood with the aid of the description given hereinafter of a vertical reproducing apparatus provided with an objective mounted in accordance with the invention, an apparatus the choice of which would not limit the scope of the invention which is given by way of illustration with reference to the accompanying drawings in which:

FIG. 1 is a diagrammatic side view of a vertical reproducing apparatus comprising an objective mounting system in accordance with the invention;

FIG. 2 is a partial view of the apparatus of FIG. 1, set up for maximum enlargement;

FIG. 3 is a partial view of the apparatus of FIG. 1 adjusted for maximum reduction;

FIG. 4 is a longitudinal sectional view of an embodiment of a reproducing apparatus in accordance with the invention;

FIG. 7 is a perspective view showing the mounting of the objective of the apparatus shown in FIG. 4.

The same reference numerals designate corresponding elements throughout the various figures.

Figure 5:
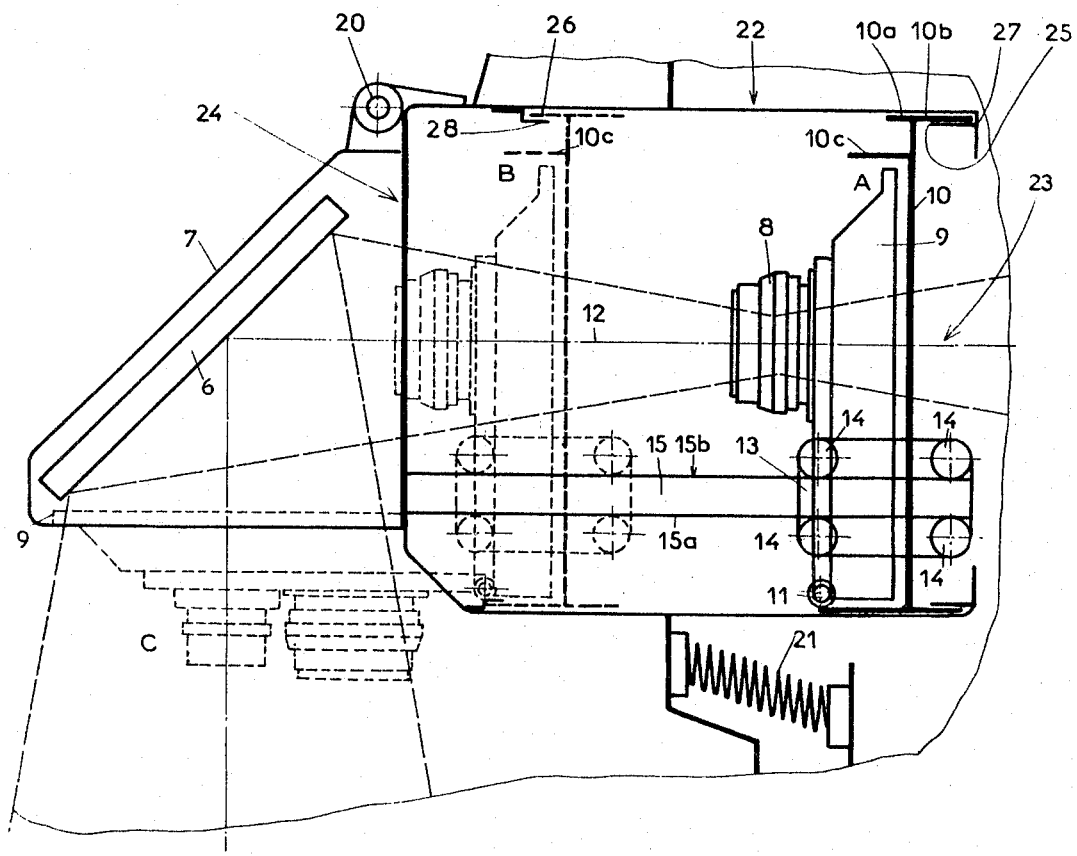
FIGS. 5 and 6 show parts of FIG. 4 on an enlarged scale.

In FIG. 1 can be seen a vertical reproducing apparatus comprising essentially a solid column 1 of which one vertical surface 1a supports a vertically movable document carrier carriage 2 and of which an upper horizontal portion 1b carries a horizontally movable film carrier carriage 3.

The mobility of the document carrier carriage 2 and/or that of the film carrier carriage 3 may be obtained by any appropriate means and, for example, by the intermediary of bearings fixed respectively to the film carrier and document carrier carriages and rolling in contact with guide tracks fixed respectively to the portions 1a and 1b of the column 1. Such means are conventional in the art and do not need to be described in detail.

The document carrier carriage 2, which carries horizontally the document 4 to be reproduced, is shown in FIG. 1 on the one hand in a bottom position (shown in dashed lines B) and on the other hand in an upper position (shown in full lines H).

The film carrier carriage 3 which carries the film 5 or any other reproducing material vertically is shown in FIG. 1 in two different positions, marked D and G and corresponding respectively to the positions H and B of the document.

It will be understood that the carriages may occupy all intermediate positions between the positions shown, which are given by way of example.

The optical system used to form on the surface 5 an image of the document 4 comprises an image transfer device such as a mirror 6 mounted in a casing 7 and an objective 8 mounted on a swing plate 9.

The swing plate 9 is mounted for pivoting about an axis 11 and can occupy one or other of the two positions I and II, the first in which it is parallel to the document and the second in which it is parallel to the film.

Pivoting of the swing plate 9 could be effected without it being necessary to remove the mirror to enable this displacement; in the contrary case, the casing of the mirror could be mounted for pivoting movements in order to enable the mirror to be retracted upwards during pivoting of the swing plate.

According to another characteristic of the device shown, the swing plate 9 could be displaced horizontally by any appropriate known means, from the position II to a position III in which the objective is then further displaced from the image turning mirror 6.

FIGS. 2 and 3 illustrate the operation of the apparatus set up to obtain an image 5 of a document 4 with maximum enlargement (FIG. 2) or maximum reduction (FIG. 3).

FIGURES 4 to 7 relate to a practical embodiment of a reproducing apparatus of the type of the apparatus shown diagrammatically in FIG. 1.

In this embodiment, the swing plate carrying the objective or objectives of the reproducing apparatus is mounted for pivoting on a support which itself is mounted for translatory movement in the reproducing apparatus, the support being provided with displacement means cooperating with the guiding means with which the apparatus is provided, the support and the apparatus comprising moreover cooperating means ensuring the required light tightness of the apparatus when the support occupies a position corresponding to a possible working disposition of the objective.

In practice, the swing plate 9 could be composed of a disc 9a carrying the objectives and mounted for rotation about a pin 9c fixed to a plate 9b itself mounted for pivoting on a vertical frame 10 about a pin 11 perpendicular to the optical axis of the objective; the pivotal mounting of the swing plate 9 is effected by any appropriate means, for example by the action of lateral projections 34 from the frame 10 engaged in corresponding housings 35 fixed to the plate 9b, or vice versa, a locking means 36, of any kind, enabling the swing plate to be held in the vertical position when that is required.

The frame 10 to which the swing plate is fixed can move translationally in the reproducing apparatus, this translatory movement having the effect of displacing the objective 8 along its optical axis represented at 12.

Such a horizontal displacement of the frame 10 is made possible by any appropriate means, for example by fixing to the frame carriages 13 provided with rollers 14 which can roll in contact with profiles 15 mounted in the reproducing apparatus and offering for the rollers rolling surfaces 15a and 15b parallel to the optical axis of the objective 8.

In order to increase the stability of the objective 8 during its translatory movement, the number of the guiding means for the frame 10 can be increased and disposed in a judicious manner in relation to the frame.

One could, for example, provide at least two carriages and two guide rails situated respectively on the right and the left of the frame 10 in the lower portion of the latter and at least one carriage and one guide rail situated above the frame 10; unwanted horizontal or vertical movements of the frame 10 are thereby prevented, these movements could otherwise occur during translatory movement of the frame parallel to the optical axis of the objective 8.

The useful horizontal travel of the frame 10 is limited by two end posts corresopnding respectively to the possible working positions II and III for an objective, and the transfer of the frame from one end post to the other may be effected manually or automatically. The manual operating control may consist, for example, in acting on a lever or button 16 in order to cause the rotation of an articulated linkage 17, 18 interconnetcing the member 16 to a point of attachment 19 affixed to the frame 10 (this articulation which is shown in FIG. 4 has been omitted from FIG. 5 for reasons of clarity).

The working position III is, in the example under consideration, a position which is effectively required for the reproduction on a reduced scale for document 4 on the film or sensitive plate 5 in the position G; the support 10, the swing plate 9 and the objective 8 have been shown in full lines when occupying this position III.

In accordance with the invention, the objective 8 may be brought into a third working position I, by pivoting through 90° of the swing plate 9 about the pin 11, the frame 10 remaining in the position which it occupies when the objective is in the position II, or remaining in the neighborhood of this position.

Pivoting of the swing plate 9 is effected in any appropriate manner requiring or not the displacement of the mirror 6 to enable the pivoting movement to take place. In the example illustrated, it is necessary to raise the mirror 6 so that the swing plate 9 may swing without hitting this mirror and this raising may be effected simply by pivoting it upwards about a pin 20 of the casing 7 of the mirror.

FIGURE 7 shows the casing 7 which has been raised in order to show better the mounting of the objective of the apparatus.

When the reproducing apparatus provided with an objective mounting in accordance with the invention is intended to work in a room which is normally illuminated, it is necessary to make light-tight the portion of the apparatus which is traversed by the light rays travelling from the objective to the sensitive surface in such a manner that this portion cannot be effectively penetrated except by the light rays coming from the objective.

This light tightness is obtained partly, as in conventional practice, with the aid of a bellow 21 extending from the film carrier 3 to the portion of the apparatus which surrounds the objective 8 and of the other hand, in accordance with the present invention, with the aid of special arrangements relating to the mounting of the frame 10 which carries the swing plate 9 on which is mounted the objective 8.

In accordance with the invention the portion of the apparatus in which the frame 10 is mounted for translatory movement has the form of a tunnel 22 formed in the bellow 21 which is laterally light-tight and presents two ends 23 and 24 which are turned respectively towards the sensitive surface 5 and towards the mirror 6.

In the neighbourhood of each of these two ends, the tunnel 22 is provided internally with a peripheral groove, being respectively a groove 25 near the end of the opening 23 and a groove 26 near the end of the opening 24, the two grooves 25 and 26 being defined for example by shaped sections 27 and 28 suitably fixed by any appropriate means, for example by welding, to the interior periphery of the tunnel 22.

The grooves 25 and 26 are intended to receive a projecting peripheral edge of the frame 10 which presents for this purpose an edge 10a projecting towards the front and an edge 10b projecting rearwardly.

The edges 10a and 10b and the grooves 26 and 25 cooperate in such a manner that the edge 10a is forced into the groove 26 when the frame 10 is in one of the positions which limit its translational movement, and that the edge 10b of the frame is forced into the groove 25 (as shown in FIG. 5) when the frame 10 is in the other limiting end position of its travel; in each of the two cases, the edge of the frame and groove with which it cooperates form a labyrinth system such that light cannot penetrate behind the frame in passing between this frame and the internal surface of the tunnel 22.

When the swing plate 9 which carries the objective is swung in such a manner that the objective is in the position I, the conditions required for light tightness are obtained by the cooperation of the peripheral portion of the mounting 9 with a horizontal peripheral portion of the casing 7 of the mirror 6, this casing presenting a first opening which is directed downwards, that is to say towards the document 4 to be reproduced, and a second opening directed towards the reproducing surface 5.

As the invention enables the objective-carrying carriage to be stopped in any required position in the tunnel to enable the objective to be used in an intermediate position between the two positions II and III, the required conditions of light tightness may be satisfied by the use of a bellows set up for example between the frame 10 and the frame 27.

The tunnel 22 which is characteristic of the embodiment described could be replaced by any other means suitable for the realising of the required conditions of light tightness, such as for example bellows systems, without departing from the scope of the invention.

The table below shows the results obtained with a vertical reproduction device comprises an objective mounted for translation and/or for pivotol movement, according to the focal length and working position of the objective.

| Focal Length of the objective (mm): | Scale of Reproduction According to the Position of the Objective [1] | | |
|---|---|---|---|
| | III | II | I |
| 800 | 0.71 to 1.00 | 1.00 to 1.40 | |
| 600 | 0.46 to 1.60 | 0.62 to 2.15 | |
| 480 | 0.34 to 2.25 | 0.44 to 2.90 | |
| 360 | 0.23 to 0.50 | | 2 to 5.50 |
| 300 | 0.18 to 0.40 | | 2.70 to 6.80 |
| 240 | 0.14 to 0.28 | | 3.50 to 8.75 |

[1] The travel of the objective between the positions II and III is about 32 cm. in the example under consideration, and the scale of reproduction should be adjusted to the relationship of the surface of the image obtained to that of the document being photographed.

It will be seen that a reproducing apparatus in accordance with the invention enables scales of reproduction to be obtained substantially covering a range from a reduction to one tenth to an enlargement of nine times.

According to a supplementary characteristic of this embodiment of the apparatus of the invention, the film carrying carriage 3 of the apparatus comprises an optical system which enables an enlarged image of a scale fixed to the apparatus and graduated in ratios of enlargement or reduction to be projected into the field of vision of the operator of the apparatus. This scale permits the operator to fix exactly the position of the film carrier in accordance with the scale of reproduction which he wishes to effect, by displacing the film carrier until the image of the corresponding graduation of the regulating scale comes opposite a suitable index. The operator has then only to displace the document carrier until he obtains a clear image of the document on the ground glass screen which is provisionally mounted in place of the film: these conditions being effected, the operator is assured of obtaining a suitable image of the document on the required scale of reproduction.

Figure 6:
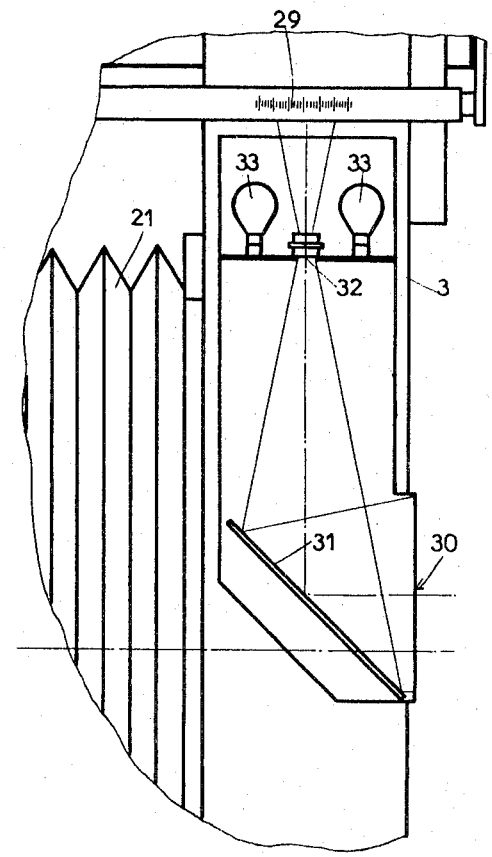

The right hand portion of FIG. 4 and the detailed view in FIG. 6 show the graduated scale 29 fixed to the fixed part of the apparatus, an enlarged image of the scale being visible to an observer placed at 30 by way of an optical system composed of a mirror 31 and an objective 32, the scale being illuminated by lamps 33.

For clarity in the drawing, the graduations of the scale have only been shown in FIGS. 4 and 6 in the neighbourhood of the film carrier but it will be understood that these graduations extend over the whole length of the scale which corresponds to the range of possible movements of the film carrying carriage. Moreover in accordance with the invention the scale my undergo a corresponding displacement to that of the objective between the positions II and III.

Of course, the invention described above with reference to one example of a vertical reproducing apparatus can be applied also to any reproducing device having a film carrier (and a document carrier) which is fixed or movable and in which it could be advantageous to have an objective mounted solely for translational or pivotal movement.

It provides, for example, an enlarger comprising essentially a horizontal film carrier, a vertical film carrier, a mirror inclined at 45° to the horizontal and directing onto one film an image of the other film, and an objective associated with one film carrier and movable in translation along the length of its optical axis between this film carrier and the mirror.

The objective may be associated by means of a bellows device with the vertical film carrier and may be displaceable horizontally, the horizontal film carrier being displaceable vertically in relation to the fixed mirror.

It should be understood finally that one could use other image transfer devices, combine these devices in such a manner as to work with a document and a film in parallel, etc., without departing from the scope of the invention since the objective could, in relation to the mirror or like element, be placed in one or the other of two positions situated at 90° to each other and/or in any one of at least two positions parallel to each other while understanding by mirror or like element any optical transfer or return device putting into optical relation the document to be reproduced and the reproducing surface.

I claim:

1. Photographic reproduction apparatus of the vertical type comprising a translatable document carrier and a translatable film carrier arranged in mutually perpendicular planes, and an optical image transfer element and an objective positioned between said document carrier and said film carrier to obtain on said film an image of the document, a frame positioned between said transfer element and one of said carriers and mounting said objective, and means mounting said frame for translatory movement relative to said optical image transfer element, along an optical axis intersecting said optical transfer element, from one determined working position to another determined working position to vary the scale of reproduction.

2. Reproduction apparatus, according to claim 1, in which said frame is movable in a tunnel formed in the apparatus, and including an articulated linkage connected to said frame within said tunnel to move said frame along said tunnel; and operating means exterior to said tunnel and connected to said linkage to operate said linkage to move said frame between working positions.

3. Reproduction apparatus according to claim 1 in which the said frame is movable in a tunnel formed in the apparatus, said tunnel being laterally light-tight, the tunnel and the frame being provided with cooperating portions to prevent the ingress of light behind the frame other than through the objective when the latter occupies either one of two limiting working positions.

4. Photographic reproduction apparatus comprising a document carrier, a translatable film carrier, and at least one optical image transfer element and at least one objective between said document carrier and said film carrier whereby to obtain on said film an image of different size of the document, and means mounting said objective and at least one of said carriers for independent translatory movement along an optical axis intersecting the optical transfer element, at least one objective being mounted on a frame and means mounting said frame for translatory movement along the optical axis intersecting the optical transfer element, said frame being movable in a tunnel formed in the apparatus, said tunnel being laterally light-tight, the tunnel and the frame being provided with cooperating portions to prevent ingress of light behind the frame other than through the objective when the latter occupies either one of two limiting working positions, said cooperating portions comprising a peripheral edge of one of said tunnel and said frame, said edge penetrating into an annular internal groove of the other of said tunnel and said frame.

5. Reproduction apparatus, according to claim 4, in which said frame mounting means comprises guide means for the displacement of the frame in relation to the optical transfer element.

6. Reproduction apparatus according to claim 5 in which the guide means comprise rails fixed to the apparatus and cooperating with rollers rotatably mounted on the frame.

7. Photographic reproduction apparatus comprising a document carrier, a film carrier, and at least one optical image transfer element and at least one objective between said document carrier and said film carrier whereby to obtain on said film on image of different size of the document, and means mounting both said object and at least one of said carriers for independent translatory movement along an optical axis intersecting the optical transfer element, and in which the objective movable translationally is also movable pivotally in relation to the optical image transfer element in such a manner as to be pivotally movable between a working position located between one of said carriers and said transfer element and another working position located between the other of said carriers and said transfer element.

8. Reproduction apparatus according to claim 7 in which the objective is carried by a swing plate, and means mounting said swing plate on said frame for pivotal movement about an axis perpendicular to the optical axis of the objective carried by swing plate.

9. Reproduction apparatus, according to claim 8, in which said swing plate comprises a disk carrying at least two objectives and a plate mounting said disk for rotation about an axis parallel to the optical axes of the objectives.

10. Reproduction apparatus, according to claim 4, including an articulated linkage connected to said frame within said tunnel to move said frame along said tunnel; and operating means exterior to said tunnel and connected to said linkage to operate said linkage to move said frame between working positions.

References Cited

UNITED STATES PATENTS

| | | | |
|---|---|---|---|
| 2,050,571 | 8/1936 | Johnson | 88—24 |
| 2,940,358 | 6/1960 | Rosenthal | 88—24 |
| 3,208,338 | 9/1965 | Davis | 88—24 |

NORTON ANSHER, *Primary Examiner.*

JOHN M. HORAN, *Examiner.*

R. A. WINTERCORN, *Assistant Examiner.*